United States Patent
Matza et al.

(10) Patent No.: US 12,220,690 B2
(45) Date of Patent: *Feb. 11, 2025

(54) METHOD OF EQUIPMENT DECONTAMINATION

(71) Applicant: United Laboratories International, LLC, Houston, TX (US)

(72) Inventors: Stephen D. Matza, Sugar Land, TX (US); Elisa Rice, Houston, TX (US)

(73) Assignee: United Laboratories International, LLC, Houston, TX (US)

( * ) Notice: Subject to any disclaimer, the term of this patent is extended or adjusted under 35 U.S.C. 154(b) by 1164 days.

This patent is subject to a terminal disclaimer.

(21) Appl. No.: 17/064,396

(22) Filed: Oct. 6, 2020

(65) Prior Publication Data

US 2021/0023548 A1    Jan. 28, 2021

Related U.S. Application Data

(63) Continuation-in-part of application No. 16/290,679, filed on Mar. 1, 2019, now Pat. No. 11,786,893.

(51) Int. Cl.
*B01J 38/58*    (2006.01)
*B01J 29/90*    (2006.01)

(52) U.S. Cl.
CPC ............... *B01J 38/58* (2013.01); *B01J 29/90* (2013.01)

(58) Field of Classification Search
CPC .................................. B01J 38/58; B01J 29/90
USPC ......................................................... 502/30
See application file for complete search history.

(56) References Cited

U.S. PATENT DOCUMENTS

| | | |
|---|---|---|
| 3,720,602 A | 3/1973 | Riley et al. |
| 4,008,764 A | 2/1977 | Allen |
| 4,344,841 A | 8/1982 | Johnson et al. |
| 4,980,046 A | 12/1990 | Zarchy et al. |
| 5,013,366 A | 5/1991 | Jackson et al. |
| 5,035,792 A | 7/1991 | Foutsitzis et al. |
| 5,332,705 A | 7/1994 | Huang et al. |
| 5,417,846 A | 5/1995 | Renard |
| 5,496,395 A | 3/1996 | Yamazaki |
| 5,705,135 A | 1/1998 | Deberry et al. |
| 5,868,004 A | 2/1999 | Rojey et al. |
| 6,173,776 B1 | 1/2001 | Furman et al. |
| 6,348,101 B1 | 2/2002 | Walter |
| 6,355,113 B1 | 3/2002 | Nalewajek et al. |
| 6,462,011 B1 | 10/2002 | Collins et al. |
| 6,504,051 B1 | 1/2003 | Miller et al. |
| 6,551,660 B2 | 4/2003 | Holtermann et al. |
| 6,627,110 B1 | 9/2003 | Smith et al. |
| 6,699,330 B1 | 3/2004 | Muraoka |
| 6,823,879 B2 | 11/2004 | Fillipi et al. |
| 6,849,192 B2 | 2/2005 | Nakasaki |
| 6,893,475 B1 | 5/2005 | Ellis et al. |
| 6,936,112 B2 | 8/2005 | Jansen et al. |
| 7,442,233 B2 | 10/2008 | Mitariten |
| 7,470,829 B2 | 12/2008 | Cadours et al. |
| 7,517,389 B2 | 4/2009 | Van De Graaf et al. |
| 7,750,066 B2 | 7/2010 | Sutherland |
| 8,066,819 B2 | 11/2011 | Waleh et al. |
| 8,197,695 B2 | 6/2012 | Cousins et al. |
| 8,262,773 B2 | 9/2012 | Northrop et al. |
| 8,480,812 B2 | 7/2013 | Nath et al. |
| 8,668,823 B2 | 3/2014 | Gudde et al. |
| 9,017,488 B2 | 4/2015 | Nath et al. |
| 9,328,300 B2 | 5/2016 | Ferrara |
| 2003/0168383 A1 | 9/2003 | Hoekstra et al. |
| 2017/0037327 A1 | 2/2017 | Ferrara |
| 2017/0189846 A1 | 7/2017 | Cho-Young-Gun et al. |

FOREIGN PATENT DOCUMENTS

| | | |
|---|---|---|
| CL | 40116 | 5/1994 |
| CL | 199400643 | 6/1995 |
| CL | 45376 | 3/2005 |
| CL | 200500484 | 5/2006 |
| CL | 201502888 | 3/2017 |
| EP | 1866592 | 12/2007 |
| WO | 2010019543 | 2/2010 |

OTHER PUBLICATIONS

"Solvent Replacement for Green Processing"; Massachusetts Institute of Technology, Feb. 1998.
Belarus Examination Report for Application No. 20190150 dated May 17, 2019.
Extended European Search Report for Application No. 19173949.9 dated Oct. 24, 2019.
Chilean Examination Report with English Translation for Application No. 201901501 dated Oct. 15, 2020.
Chilean Search Report with English Translation for Application No. 201901501 dated Oct. 15, 2020.
USPTO Non-Final Office Action for U.S. Appl. No. 17/022,237 dated Nov. 22, 2021.
Korean Examination Report for Application No. 10-2019-0057986 dated Dec. 11, 2021.
Korean Examination Report for Application No. 10-2019-0057986 dated Sep. 7, 2021.
USPTO Final Office Action for U.S. Appl. No. 16/290,679 dated Dec. 22, 2021.
European Patent Office Search Report for Application No. 19173949.9-1101 dated Apr. 1, 2022.

(Continued)

*Primary Examiner* — Edward M Johnson

(74) *Attorney, Agent, or Firm* — Thaddeus J. Faleski; Ryan D. Jenlink; Conley Rose, P.C.

(57) ABSTRACT

A method of equipment decontamination may include: introducing a cleaning stream comprising hydrogen and a solvent comprising a fatty acid methyl ester and an oxygenated solvent, or alternatively comprising a carrier fluid and a hydrocarbon solvent, into the equipment; and introducing a stream comprising nitrogen into the equipment, wherein the equipment comprises deposits and other contaminants.

20 Claims, 3 Drawing Sheets

(56) References Cited

OTHER PUBLICATIONS

USPTO Notice of Allowance for U.S. Appl. No. 16/290,679 dated Mar. 31, 2022.
Chilean Examination Report for Application No. 201901501 dated Jul. 12, 2021.
Chilean Search Report for Application No. 201901501 dated Jul. 12, 2021.

METHOD OF EQUIPMENT DECONTAMINATION

CROSS-REFERENCE TO RELATED APPLICATIONS

This application is a continuation-in-part of U.S. application Ser. No. 16/290,679 filed on Mar. 1, 2019, the disclosure of which is incorporated by reference herein in its entirety.

STATEMENT REGARDING FEDERALLY SPONSORED RESEARCH OR DEVELOPMENT

Not applicable.

BACKGROUND OF THE INVENTION

Field of the Invention

This invention relates to the field of industrial facility cleanup and more specifically to the disaggregation and subsequent removal of coke deposits on catalyst and to reduce vapors below the lower explosive limit (LEL) to allow for safe vessel entry into industrial equipment.

Background of the Invention

During the refinement process of crude oil and natural gas, reactors may be used to produce various products from a hydrocarbon feed stream. Reactors may comprise a catalyst which may promote conversion from a reactant to a product. Catalysts may allow for reactions to occur at lower severity (e.g. lower temperature and pressure) and with greater selectivity to desired products by providing an alternative reaction mechanism with a lower activation energy than a non-catalyzed mechanism. Catalysts are a critical component of hydrocarbon processing and catalyst performance may determine quality of the products and profitability of a hydrocarbon processing operation. As such, catalyst performance is often a closely monitored metric in the operation of a reactor. Some common hydrocarbon processing operations that use catalyst may include cracking, such as fluidized catalytic cracking and thermal cracking, hydro processing such as hydro treating and hydrocracking, catalytic reformation, dehydrogenation, and other operations well known in the art.

Carbon deposits, often referred to as coke, may foul reactors and catalyst therein that process hydrocarbon streams. Coke forming reactions are generally undesirable as the coke that forms may collect on the surface of catalyst and reduce catalytic activity. While process design and process operation may reduce the amount of coke formed, the complete elimination of coke forming reactions may not be possible in all processes. Once a catalyst has been fouled by coke deposits, the catalyst may require regeneration to regain catalytic activity. In addition to coke, additional contaminants may be deposited on the reactor vessel and catalyst. Contaminants including coke may be referred to collectively as "deposits." The additional contaminants are generally process specific and may include hydrocarbons such as saturated and unsaturated hydrocarbon, aromatic hydrocarbon such as benzene, as well as gums, resins, heavy oil deposits, oligomers, and porphyrins containing nickel and vanadium, for example. In some systems that process sour hydrocarbons, hydrogen sulfide may also be a contaminant.

Due to the reduction in catalytic activity induced by coke and other deposits, catalysts may be periodically regenerated to regain catalytic activity as part of the reactor's operation. In addition to on stream regeneration, most units may be periodically shut down during a plant turnaround to remove fouling and regenerate catalyst. During routine maintenance of equipment such as during a turnaround event, removal of catalyst from equipment and/or entry into the equipment may be necessary. There may be many challenges to removing fouled catalyst such as the catalyst becoming immobile from coke deposition and agglomeration of the catalyst into larger pieces which may impair removal efforts. Coke and other deposits described above may be agglomerated on internals of reactors which may cause the internals to become difficult to remove.

Furthermore, residual deposits such as coke, $H_2S$, and other hydrocarbons previously described present in the equipment may pose a fire hazard when the equipment is opened to remove catalyst or for entry. The lower explosive limit (LEL) may be the lowest concentration of a vapor in air capable of producing a fire when exposed to an ignition source. Controlling vapor concentrations within reactors to below the LEL to allow for safe removal of catalyst and vessel entry may be a concern for operators as regulations and safety requirements dictate that LEL must be controlled before a vessel can be opened.

Various techniques have been developed that enable removal of deposits from catalyst that also reduce vapor concentrations below the LEL. The particular techniques used to remove deposits and reduce hydrocarbon vapor concentration to below LEL may depend upon the particular catalyst and equipment in which the catalyst is present. For example, the catalysts used in hydroprocessing applications may be particularly sensitive and may readily convert to inactive states when exposed to certain regeneration treatments. Furthermore, the de-coking and vapor removal treatment may inadvertently introduce catalyst poison which may reduce the activity of the catalyst after treatment. In some equipment, simple steaming out of units may be performed to remove coke and hydrocarbon vapor. Steaming out may be a generally slow process that typically may include a unit to be shut down for an extended period of time. Additionally, the excess temperature associated with the steam for decontamination may compact and condense coke from "soft" coke to "hard" coke resulting in tougher deposits than were originally present. The tough hydrocarbon deposits may be removed by mechanical action that may result in longer downtimes or equipment and catalyst damage.

Other techniques may include a hydrogen sweep followed by a nitrogen purge. The hydrogen sweep method may remove a portion of hydrocarbon vapors and $H_2S$ but may not bring the hydrocarbon vapors and $H_2S$ down to acceptable levels for vessel entry. Another method may comprise a hot hydrogen strip followed by nitrogen. The hot hydrogen may be introduced into the equipment at an elevated temperature, e.g. 700° F. (341° C.) or greater. The high heat and gas flow of hydrogen may break up hydrocarbon deposits and allow the hydrocarbons to flow out of the equipment. A nitrogen purge may then be used to push out any residual hydrogen and hydrocarbons and reduce the hydrocarbon vapors to below the LEL and temperature to an acceptable entry level. Again, the hot hydrogen sweep may not always be effective in reducing LEL and $H_2S$ to below acceptable levels. Furthermore, the hydrogen sweep and hot hydrogen strip is a relatively slow process and may involve several days to complete, thereby increasing the cost associated with the treatment.

Consequently, there is a need in the art for new methods of deposit removal that also reduce hydrocarbon vapors to below the LEL and allow for de-inventorying of catalyst and safe entry into equipment in a shorter period of time.

BRIEF SUMMARY OF SOME OF THE PREFERRED EMBODIMENTS

These and other needs in the art are addressed in an embodiment whereby a hot hydrogen stream comprising hydrogen, a fatty acid methyl ester, and an oxygenated solvent are circulated through equipment. The hot hydrogen stream may dissolve and disaggregate at least a portion of deposits collected in the equipment.

In embodiments, a method of equipment decontamination includes introducing a cleaning stream comprising hydrogen and a solvent comprising a fatty acid methyl ester and an oxygenated solvent into the equipment. The method also includes introducing a stream comprising nitrogen into the equipment, wherein the equipment comprises deposits.

In other embodiments, a method includes introducing a stream comprising hydrogen into a reactor. The reactor includes a catalyst, deposits on the catalyst, and other contaminants. The method also includes introducing into the stream comprising hydrogen a solvent stream comprising a fatty acid methyl ester and an oxygenated solvent and vaporizing the solvent stream into the stream comprising hydrogen to produce a cleaning stream. The method further includes contacting the deposits with the cleaning stream and removing at least a portion of the deposits and other contaminants with the cleaning stream. In addition, the method includes introducing a nitrogen stream into the reactor.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
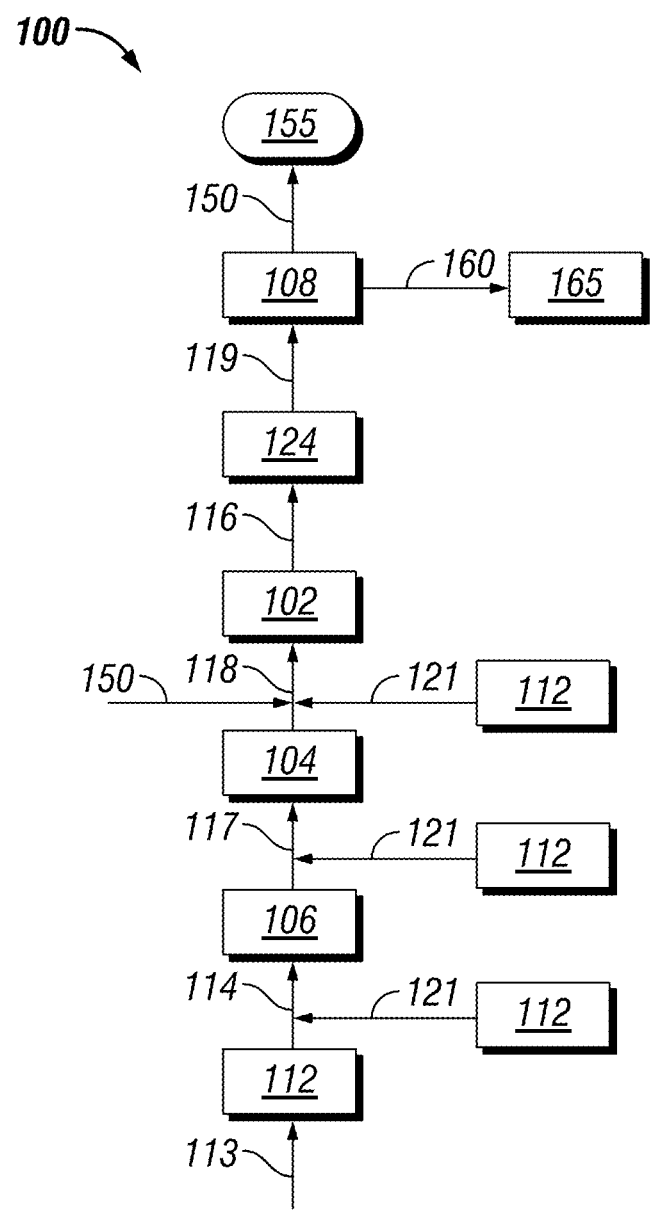
FIG. 1 illustrates an embodiment of a system where a solvent composition may be used to remove contaminants from equipment.

As discussed above, in some equipment cleaning techniques including a hot hydrogen sweep and nitrogen purge may be used to clean and regenerate catalysts. In an embodiment of the present application, a solvent composition may be injected into the hot hydrogen stream such that the solvent composition is vaporized and carried into a reactor alongside the hot hydrogen. In some embodiments, the solvent composition is vaporized and/or dispersed. The addition of the solvent composition may increase the effectiveness of the treatment to remove deposits such as hydrocarbons and $H_2S$, and lower the concentration of hydrocarbon vapors in the head space. In embodiments, the solvent composition may be used to remove a contaminant material from any industrial equipment or vessel including, but not limited to, reactors, vessels, tanks, vacuum towers, heat exchangers, piping, distillation columns, and the like. Some specific applications may include, but are not limited to, olefins processing, fluid catalytic cracking, hydrotreating, ammonia processing, and other processes that use a catalyst. Further, without limitation, the solvent composition may remove a sufficient amount of contaminant material from the industrial equipment or vessel to allow manned entry in a safe manner. In embodiments, contaminant materials to be removed may include any contaminant material produced, stored, transported, or the like during the process of crude oil refinement, natural gas processing, hydrocarbon transport, hydrocarbon processing, hydrocarbon cleanup, and the like. In embodiments, examples of contaminant materials or deposits may include residual oil, hydrogen sulfide, combustible gas, coke, oligomers, the like, or any combinations thereof. In embodiments, the contaminant materials are contacted with the solvent composition and hot hydrogen, such that the deposits are disaggregated and/or dissolved and may then be subsequently removed from the industrial equipment by flowing the deposits out of the equipment with the hydrogen and/or nitrogen gas.

In an embodiment, the solvent composition may comprise a fatty acid methyl ester and an oxygenated solvent. The fatty acid methyl ester may be the product of transesterification of soybean oil with methanol, for example. The fatty acid methyl ester may also be a biodiesel or a biodiesel equivalent blend. In some embodiments, the fatty acid methyl ester may comprise structure (1) where R is a $C_{14}$-$C_{18}$ alkyl group.

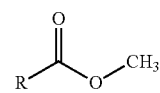

(1)

In embodiments, the oxygenated solvent may comprise glycol ethers such as di-propylene glycol, alcohols such as benzyl alcohol, esters such as ethyl lactate, ethoxylated alcohols, glycol ether acetates or combinations thereof. Further, the oxygenated solvent may be an effective scrubber for removal of or lowering the concentration of aromatic dispersed combustible materials (e.g., hydrocarbon vapors), thus lowering LEL levels. Lowering LEL levels may promote safe and effective vessel entry. In embodiments, the fatty acid methyl ester and oxygenated solvent may be present in any ratio in the solvent composition. Without limitation, the amount of fatty acid methyl ester and oxygenated solvent may depend on many factors including the identity of the fatty acid methyl ester and oxygenated solvent. In embodiments, the fatty acid methyl ester may be present in an amount ranging between about 70% to about 100% by volume of the solvent composition with the balance volume being the oxygenated solvent or combination of aforementioned oxygenated solvents. Alternatively, the fatty acid methyl ester may be present at a point in a range of about 70% to about 75% by volume, about 75% to about 80% by volume, about 85% to about 90% by volume, about 90% to about 95% by volume, about 95% to about 99.5%, or about 99.5% to about 100% by volume of the solvent composition, or any value in between the explicitly stated ranges. One of ordinary skill in the art with the benefit of this disclosure should be able to select an appropriate identity and amount of fatty acid methyl ester and oxygenated solvent for a particular application.

In an alternative embodiment, the solvent composition may comprise a refinery cutting fluid and a hydrocarbon solvent. The refinery cutting fluid may be any material capable of being naturally distilled from crude oil. At many refineries, crude oil comprising a mixture of various hydrocarbons, may undergo a distillation process. The distillation process aims to separate the crude oil into its various components including, without limitation, residual fuel oil, heavy gas oil, distillate (diesel), kerosene, naphtha, gasoline blending components, butane, and lighter products. In utilizing a naturally occurring refinery cutting fluid, utility costs for producing the solvent composition may be lowered and the flash point for shipping the solvent composition may be increased. In embodiments, the refinery cutting fluid may comprise diesel, kerosene, naphtha, or any combinations thereof. In embodiments, the refinery cutting fluid may be kerosene.

In embodiments, the hydrocarbon solvent may be any hydrocarbon compound. In embodiment the hydrocarbon compound may be bicyclic, comprising two fused benzene rings. The two fused benzene rings may be aromatic, saturated, or any combinations thereof. In embodiments, the two fused benzene rings may comprise one aromatic ring and one saturated ring which may result in a hydrocarbon compound with a high Kauri Butanol (Kb) value. The Kb value is a standardized measure of solvent power for a hydrocarbon solvent. In embodiments, the hydrocarbon solvent may have a Kb value between about 120 Kb and about 150 Kb, or alternatively between about 130 Kb and about 140 Kb. In embodiments, the hydrocarbon solvent may have a Kb value of 132 Kb. A suitable hydrocarbon solvent may comprise, without limitation, naphthalene, tetralin, decalin, or any combinations thereof. In embodiments, the hydrocarbon solvent may be tetralin.

In embodiments, the hydrocarbon solvent and the carrier fluid may be present in any ratio in the solvent composition. In embodiments, the hydrocarbon solvent may be present in an amount ranging between about 60% to about 100% by volume of the solvent composition with the balance volume being the cutting fluid. Alternatively, the hydrocarbon solvent may be present at a point in a range of about 60% to about 70% by volume, about 70% to about 80% by volume, about 80% to about 90% by volume, about 90% to about 95% by volume, about 95% to about 99.5%, or about 99.5% to about 100% by volume of the solvent composition, or any value in between the explicitly stated ranges. One of ordinary skill in the art with the benefit of this disclosure should be able to select an appropriate identity and amount of the hydrocarbon solvent and cutting fluid for a particular application.

In embodiments, in which the oxygenated solvent is not utilized in the solvent composition, the removal of entrapped aromatic dispersed combustible materials may be accomplished by virtue of superior solvency for the deposits which serve to entrap the aromatic dispersed combustible materials. As such, these embodiments may also promote higher success rates for achieving adequate LEL levels to permit safe and effective vessel entry.

In embodiments, the solvent composition may have a boiling point in a range of about 125° C. to about 300° C. depending on the identity and volumetric ratio of the chemical species in the solvent composition. There may be advantages to relatively higher boiling point solvent compositions, namely that vapor phase chemistries have higher performance at relatively higher temperatures. A hot hydrogen strip process using a solvent composition having a relatively higher boiling point may be operable at relatively higher temperatures of about 260° C. to about 400° C. Further, there may be advantages to relatively lower boiling point solvent compositions, namely that the vapor phase chemistries may allow for the solvent composition to be introduced into industrial equipment operating at lower temperatures. A hot hydrogen strip process using a solvent composition having a relatively lower boiling point may be operable at relatively low temperatures of about 150° C. to about 300° C. For example, the solvent composition with the relatively lower boiling point may be used in a hot hydrogen strip process performed on catalysts associated with reactors utilized by certain industrial equipment. In embodiments, the industrial equipment may comprise, without limitation, hydrotreaters, naphtha hydrotreaters, hydrocrackers, or any combinations thereof.

In an embodiment of the present application, deposits may be removed from equipment by introducing a hot hydrogen stream comprising the solvent composition into the equipment. The solvent composition may be present in any amount in the hot hydrogen stream, depending on various factors such as vessel size, volume of catalyst in the vessel, type and amount of fouling, among many other factors. The deposit removal method may comprise injecting hot hydrogen into the equipment to heat to and/or maintain the equipment at a high temperature, which alongside the solvent composition and hydrogen, may disaggregate and dissolve deposits present in the equipment. The solvent composition may be introduced into the hot hydrogen stream causing the solvent composition to vaporize and be carried into the equipment in a gaseous phase. The gaseous solvent composition may contact deposits in the equipment and cause the deposits to be loosened or become solvated by the solvent. Deposits may become mobile from contact with the solvent composition and may flow out from the equipment. The stream exiting the equipment may be passed to a collection vessel such that the deposits may be collected for disposal. The hydrogen gas stream may be collected, recycled, and heated again so that additional solvent composition may be added. The recycled hydrogen may be passed to the equipment to further remove more deposits. The hot hydrogen may be introduced into the equipment at a temperature of between about 200° C. to about 430° C., or any temperature in-between. Alternatively, the hot hydrogen may be introduced into the equipment at a temperature of between about 150° C. to about 300° C., or any temperature in-between. In embodiments, the temperature at which the hot hydrogen may be introduced into the equipment may depend on the particular application. The hydrogen stream may be heated by any method including, for example, an electric or a fired heater. One of ordinary skill in the art, with the benefit of this disclosure, should be able to select an appropriate temperature for a particular application.

Reference will now be made to FIG. 1 which illustrates an embodiment of a system 100 where the solvent composition may be used. System 100 may comprise fouled equipment 102, heater 104, heat exchanger 106, separation equipment 108, and additive pump 112. Fouled equipment 102 may comprise industrial equipment or vessels including, but not limited to, reactors, vessels, tanks, vacuum towers, heat exchangers, piping, distillation columns, and the like. Fouled equipment 102 may comprise any of the fouling previously discussed including coke, $H_2S$, unsaturated hydrocarbons, aromatic hydrocarbons such as benzene, as well as gums, resins, heavy oil deposits, and oligomers, for example. Hydrogen may be introduced through stream 113 into additive pump 112. An output stream from additive pump 112 is input stream 114, which is introduced to heat exchanger 106. Heat exchanger 106 may heat input stream 114 to a desired temperature by when input stream 114 exits as stream 117. Stream 117 from the outlet of heat exchanger 106 may be passed to heater 104 whereby heater 104 may increase the temperature of the stream 117 to between about 200° C. to about 430° C., alternatively between about 260° C. and about 430° C., alternatively to between about 150° C. to about 300° C., or alternatively to between about 200° C. to about 300° C.

As previously discussed, a solvent composition may be injected into the hydrogen stream at one or more points prior to the hydrogen stream reaching fouled equipment 102. For example, the solvent composition may be introduced at any of the injection points 121. The solvent composition may be introduced by any suitable means such as by additive pumps 112 as illustrated. As illustrated in FIG. 1, injection points 121 may be before heat exchanger 106, after heat exchanger 106, or after heater 104. In some embodiments, the solvent composition may be introduced into more than one injection point 121. Heated stream 118 comprising hydrogen and the solvent composition may be introduced into fouled equipment 102 whereby the hydrogen and solvent may act to loosen and/or dissolve deposits within fouled equipment 102. Equipment output stream 116 comprising hydrogen, solvent composition, dissolved deposits, disaggregated deposits, dispersed combustible materials, benzene, and $H_2S$ may exit fouled equipment 102 and be introduced to cooling equipment 124. Cooling equipment 124 may comprise any equipment configured to cool equipment output stream 116 such that separation of components in equipment output stream 116 may be facilitated. In some embodiments, cooling equipment 124 may include refrigerated heat exchangers, air cooled heat exchangers, or integrated heat exchangers. Cooled stream 119 may exit cooling equipment 124 and be introduced to separation equipment 108. Cooled stream 119 is at a temperature between about 30° C. and about 430° C., alternatively between about 80° C. and about 280° C.

Separation equipment 108 may comprise equipment configured to separate the components of cooled stream 119 and separate the hydrogen from the solvent and deposits present in cooled stream 119. Separation equipment 108 may comprise any equipment such as, without limitation, tanks, vessels, coalescers, knock out drums, demister systems, hot separators, cold separators, de-oilers, and processes such as amine columns and caustic towers, which may treat sour components or $H_2S$ present in cooled stream 119. In an embodiment, separation equipment 108 separates hydrogen, hydrogen sulfide, and dispersed combustible materials from the solvents and deposits. In some embodiments, hydrogen stream 150 including hydrogen, hydrogen sulfide, dispersed combustible materials or any combinations thereof is directed to flare 155. In embodiments, solvent stream 160 including the solvents and deposits is introduced to collection vessel 165.

In some embodiments as shown in FIG. 1, after the concentration of deposits in the equipment output stream 116 has reached the desired level, nitrogen stream 150 may be introduced into system 100 through heated stream 118 or be introduced directly into equipment 102 (not illustrated). Nitrogen stream 150 may be introduced by any suitable means. In an embodiment, nitrogen stream 150 is not introduced by a pump. Without limitation, nitrogen stream 150 may push $H_2$, $H_2S$, solvent, dispersed combustible materials, benzene, and the like out of equipment 102. In some embodiments, nitrogen stream 150 is not heated. For instance, without limitation, nitrogen stream 150 is not heated in some embodiments because ammonia may be produced at a temperature above 500° F. The nitrogen stream 150 may flow into equipment 102 and displace hydrogen and solvent composition, and may further reduce hydrocarbon concentration in the vapor space in equipment 102 through displacement. Nitrogen stream 150 may be introduced to system 100 until the concentration of hydrocarbons leaving equipment 102 in equipment output stream 116 is at a desired level, generally below the LEL of the hydrocarbons or at a particular ppm measurement for the hydrocarbons. In embodiments, a desired target for $H_2S$ is below about 10 ppm. In an embodiment, a desired target is at about 10% or less LEL.

Figure 2:
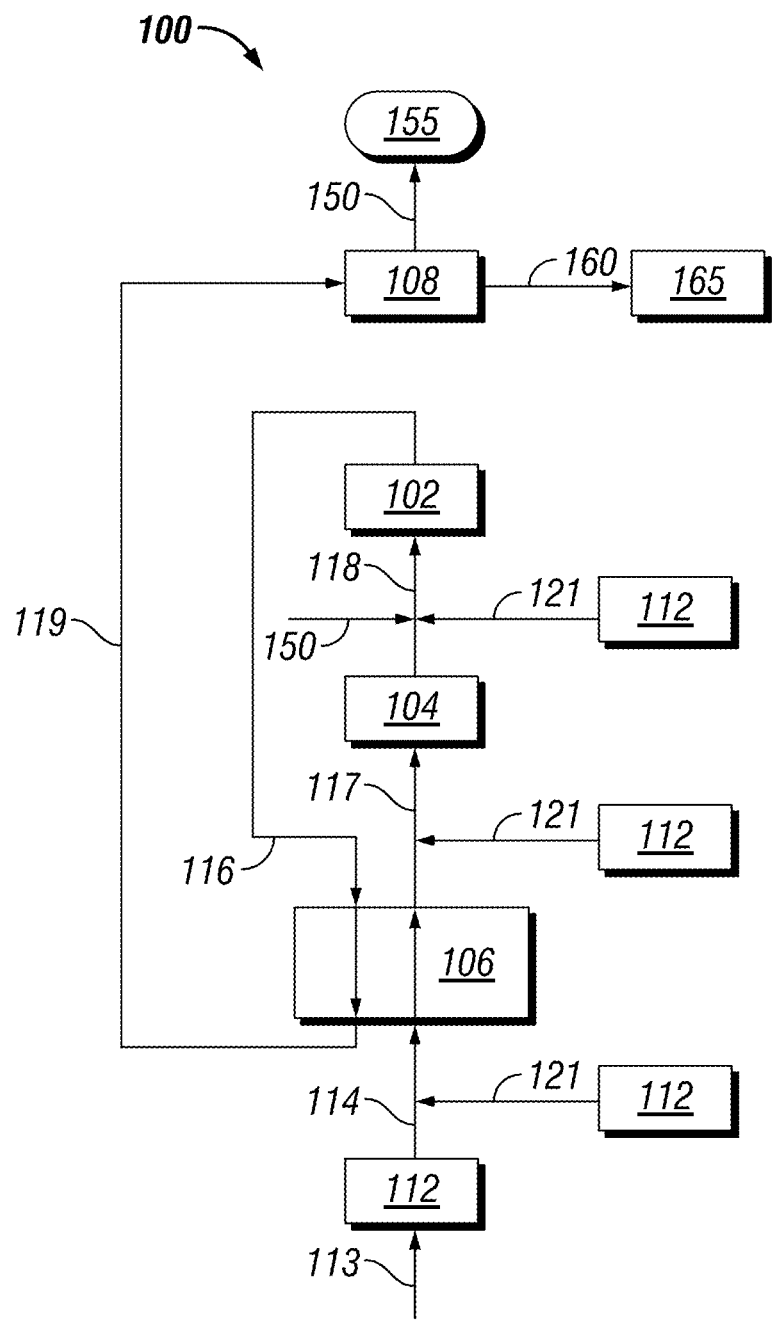
FIG. 2 illustrates an embodiment of the system of FIG. 1 in which the cooling equipment is the heat exchanger.

In an embodiment of system 100 as shown in FIG. 2, equipment output stream 116 is introduced to heat exchanger 106. In such an embodiment, input stream 114 is introduced to heat exchanger 106 as a cross-flow with equipment output stream 116 with heat exchanger 106 configured to allow heat from equipment output stream 116 to be passed to input stream 114 to heat input stream 114 and cool equipment output stream 116. In such an embodiment, input stream 114 is heated to a desired temperature by when input stream 114 exits heat exchanger 106 as stream 117. Equipment output stream 116 exits heat exchanger 106 as cooled stream 119 and is then introduced to separation equipment 108. Cooled stream 119 is at a temperature between about 30° C. and about 430° C., alternatively between about 80° C. and about 280° C.

Figure 3:
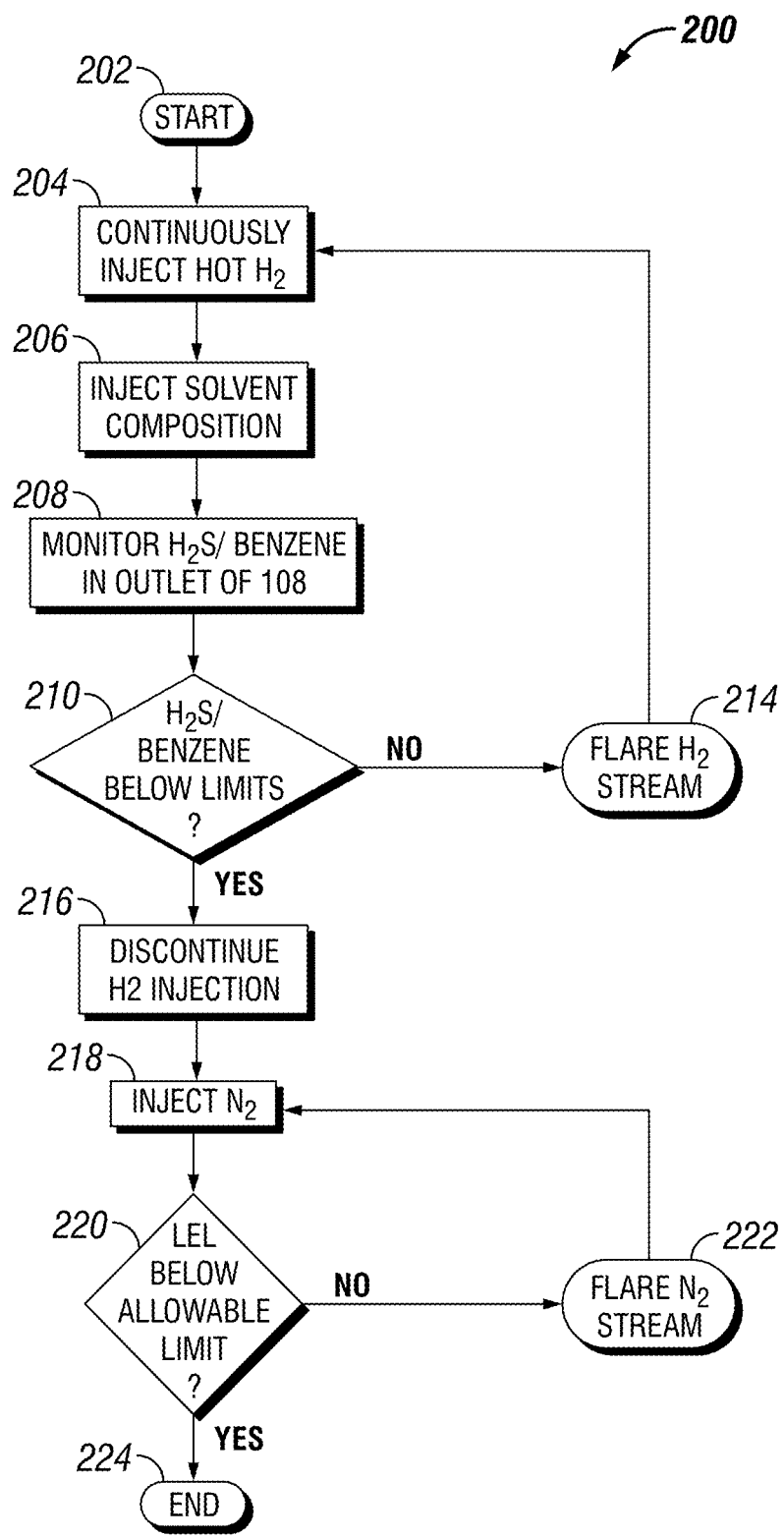
FIG. 3 is an embodiment of a flow chart detailing a process for removing contaminants from equipment.

FIG. 3 is a flowchart illustrating an embodiment of a method 200 of removing deposits from equipment using the previously described solvent composition. In embodiments, method 200 begins at bubble 202. At box 204, hot hydrogen begins to circulate through the equipment comprising the deposits (fouled equipment 102 of FIGS. 1 and 2) and other auxiliary equipment connected to the equipment comprising the deposits. The hot hydrogen may be at any suitable temperature, including about 200° C. to about 430° C., alternatively including about 150° C. to about 300° C., or any temperatures in-between. The hot hydrogen injection may start out at a relatively higher temperature of about 260° C. to about 430° C., or alternatively at a relatively lower temperature of about 150° C. to about 300° C., and the temperature may be stair-stepped or gradually lowered over a period of time to a temperature below about 230° C. Without limitation, stair-stepped or a gradually lower temperature may facilitate not producing ammonia when switching to nitrogen.

At box 206, the solvent composition is injected into the hot hydrogen stream to vaporize the solvent composition. The solvent composition may be any solvent composition previously described. The hot hydrogen stream including the solvent composition may enter the equipment (fouled equipment 102 of FIG. 1 and FIG. 2) and auxiliary equipment whereby the hydrogen and solvent composition may contact the deposits and dissolve and/or disaggregate the deposits.

The equipment used to introduce the solvent composition into the hot hydrogen stream may comprise pumps, nozzles, and associated control systems to accurately meter the solvent composition into the hot hydrogen stream. The ratio of hydrogen to solvent composition may depend on the chemical identity of the species present in the solvent composition and the equipment the hot hydrogen stream is being introduced into as previously described.

At box 208, the location of the equipment where the hot hydrogen stream flows out may be monitored for $H_2S$ and/or benzene with a monitoring device to track the progress of deposit removal. The monitoring device may be any suitable monitoring device such as a gas meter and/or a bag sample and a gas chromatograph. In embodiments, the measurement may be done in real time using in line equipment, or aliquots of the stream leaving the equipment may be drawn for later analysis. Analysis may include determining a concentration of $H_2S$ and/or benzene in the aliquot. Although not shown in FIG. 3, the concentration of solvent composition, or the volumetric flow rate of solvent composition into the hot hydrogen stream, may be adjusted to achieve more or less removal of deposits. Temperature of the hot hydrogen stream may also be adjusted in box 208.

At decision 210, the current concentration of $H_2S$ and/or benzene in the hydrogen stream is compared to the desired concentration. In an embodiment where the solvent composition and hot hydrogen are circulated though the equipment without removing the deposits, a concentration of the deposits may continuously increase until the deposits reach an equilibrium with the solvent composition, or the solvent composition removes all deposits within the equipment. In an embodiment where the solvent composition has deposits removed before re-introduction into the equipment, the concentration of deposits within an outlet stream generally may decrease over time. Whichever method is performed, the concentration of $H_2S$ and/or benzene in an outlet stream may be monitored such that the progress of deposit removal may be observed as the presence of $H_2S$ and benzene is related to the deposits. In some embodiments, the hot hydrogen and solvent composition may be circulated until the $H_2S$ and/or benzene concentration reaches a steady state where no additional deposit is being removed. In the instance where the $H_2S$ and/or benzene concentration has not reached the desired, or steady state level, the method may proceed to step 214. At step 214, the hydrogen in the outlet stream may be flared off. The method may continue with step 204 to inject more hot hydrogen into the equipment. At decision 210, when the $H_2S$ and/or benzene concentration reaches a desired level, the method may proceed to block 216, wherein the injection of hydrogen gas is discontinued, and the gas stream switches to nitrogen instead.

At block 218, nitrogen may be metered into the equipment and auxiliary equipment and circulated to displace the hot hydrogen, solvent composition, and dissolved and disaggregated deposits. As previously discussed, the concentration of hydrocarbon vapors in the headspace in an enclosed vessel may exceed the LEL for the hydrocarbon vapors thereby presenting a fire hazard if the vessel is exposed to atmosphere. The supply of nitrogen through the equipment and auxiliary equipment may cause hydrocarbons present to be displaced from the headspace. At decision 220, the LEL for the hydrocarbon vapors may be monitored. If the LEL is not below the allowable limit, step 222 may commence wherein the present nitrogen is flared off. The method may proceed to step 218 to inject more nitrogen gas into the equipment, and nitrogen may be continuously supplied until the LEL for the hydrocarbon vapors falls below a desired value. If the LEL is below the allowable limit, the process may terminate at end step 224.

To facilitate a better understanding of the present embodiments, the following examples of certain aspects of some embodiments are given. In no way should the following examples be read to limit, or define, the entire scope of the embodiments.

Example 1

Twelve formulations were prepared and tested against a d-Limonene control and another proprietary commercial solvent control to determine each formulation's ability to dissolve asphalt. Blown asphalt from a Texas refinery was chosen for dissolution testing. The asphalt was determined to soften around 175° C. (79.4° C.) and melt around 320° F. (160° C.). Densities of each component are tabulated in Table 1.

TABLE 1

| Species | density (g/ml) |
|---|---|
| d-Limonene | 0.84 |
| Benzyl alcohol | 1.04 |
| Dipropylene Glycol | 1.02 |
| Ethyl Lactate | 1.03 |

The samples were prepared according to Table 2. Liquid was prepared in a vial and sonicated for 5 minutes to ensure the mixture was homogeneous. Each liquid was then individually added to a vial containing the blown asphalt. The samples were allowed to sit at room temperature undisturbed. The commercial solvent is a proprietary solvent blend formulated to dissolve hydrogen-deficient hydrocarbon deposits such as asphalts.

TABLE 2

| Vial | Blown Asphalt (g) | Benzyl Alcohol (mL) | Dipropylene Glycol (mL) | Ethyl Lactate (mL) | d-Limonene (mL) | Commercial Solvent (mL) |
|---|---|---|---|---|---|---|
| A | 1.26 | 3.33 | 3.33 | 3.33 | — | — |
| B | 1.15 | 6 | 2 | 2 | — | — |
| C | 1.17 | 5 | 5 | — | — | — |
| D | 1.11 | 5 | — | 5 | — | — |
| E | 1.23 | — | 5 | 5 | — | — |
| F | 1.16 | 2 | 2 | 6 | — | — |
| G | 1.14 | 10 | — | — | — | — |
| H | 1.12 | — | — | 10 | — | — |
| Control | 1.28 | — | — | — | 10 | — |
| I | 1.29 | — | — | — | — | 10 |

After five minutes, it was observed that the d-Limonene sample had dissolved the most asphalt followed by the commercial solvent and thereafter samples G>B>C=D>A>F>E=H. Samples E and H did not show any signs of discoloration, and only sample G showed signs of spalling and discoloration. After one hour, sample C had begun to stick to the vial bottom. After two hours, it was observed that the commercial solvent was running, and samples A-H had not progressed. After three hours, the vials were inverted to determine progression. Samples A-H did not show notable improvement over hour two. Sample G was observed to have dark discoloration, and the d-Limonene sample was observed to be opaque. After twenty-two hours, it was observed that samples A-H had not shown significant improvement. The d-Limonene sample had dissolved approximately 85% of the asphalt, and the commercial solvent had dissolved approximately 30% of the asphalt. After twenty-six hours, the samples were placed into a warm water bath to speed dissolution of the asphalt. After about one hour in the warm water bath, the d-Limonene sample was completely dissolved. The commercial sample (vial I) continued to dissolve, and samples B, D, and G showed signs of darkening and spalling. After twenty-four hours in the hot water bath, samples A through H were observed to not have significantly improved. The samples were removed from the warm water bath and allowed to sit at ambient temperature for a period of six days. It was observed that samples A through H did not show much more dissolution after six days.

Example 2

A sample was prepared according to Table 3.

TABLE 3

| Vial | Blown Asphalt (g) | Dipropylene Glycol (mL) | Soy methyl ester (mL) |
| --- | --- | --- | --- |
| J | 1.21 | 0.4 | 9.4 |

The liquids were sonicated to mix, and the blown asphalt was added to vial J. It was observed that the solution became opaque within minutes. After about ten minutes, it was observed that about 60% of the asphalt had dissolved. After about five hours, it was observed that about 20% of the asphalt remained. Sample J was left overnight to allow further dissolution. It was observed that after about 20.5 hours, sample J was about 95% dissolved. After about forty-eight hours it was observed that sample J was completely dissolved.

Example 3

Samples were prepared according to Table 4.

TABLE 4

| Vial | Blown Asphalt (g) | Benzyl Alcohol (mL) | Ethyl Lactate (mL) | Soy methyl ester (mL) |
| --- | --- | --- | --- | --- |
| K | 1.19 | 2 | — | 8 |
| L | 1.29 | — | 2 | 8 |

The liquids were sonicated to mix, and the blown asphalt was added to each sample. It was observed that after about five minutes, samples K and L were over 50% dissolved. After forty-five minutes, K and L both appeared to have about 70-75% dissolved. After about twenty-six hours, it was observed that sample L was completely dissolved, and sample K had dissolved approximately 95%.

Example 4

Zeolite samples were prepared by filling four vials ⅗ full of 8×14 mesh zeolite, 2.5 full of 6×8 mesh zeolite, and ⅕ full of ¼×6 mesh zeolite. The Zeolite was natural zeolite (clinoptilolite). Each vial was poured into a separate beaker and mixed thoroughly. Blown asphalt was added to each vial and the vials were heated to 85° C. The temperature was increased up to 215° C. with periodic stirring until it was observed that the asphalt uniformly coated the zeolite mixture.

While the coated zeolite sample mixture was still hot, sample aliquots were taken and added to vials. Solvent compositions were prepared according to Table 5. All vials were sonicated for 5 minutes after preparation to ensure homogeneous mixing.

TABLE 5

| Vial | Blown Asphalt (g) | Benzyl Alcohol (mL) | Dipropylene Glycol (mL) | Ethyl Lactate (mL) | d-Limonene (mL) | Soy Methyl Ester (mL) |
| --- | --- | --- | --- | --- | --- | --- |
| 1 | 2.69 | — | — | — | 10 | — |
| 2 | 2.54 | — | 0.4 | — | — | 9.6 |
| 3 | 2.55 | 2 | — | — | — | 8 |
| 4 | 2.53 | — | — | 2 | — | 8 |

All vials were placed in a hot water bath at 55° C. After about thirty minutes, it was observed that vial 3 did not contain a single large agglomeration while samples 1, 2, and 3 contained a single large agglomeration. At that point, all vials were relocated to a hot mineral oil bath. After about thirty minutes, the vials were observed to be at about 93° C. It was observed that no agglomerations in any of the vials were large enough to breach the liquid level line when the vials were turned sideways, and each vial now contained smaller agglomerations and fines. The zeolite appeared to still be coated in each vial. The set point of the hot mineral oil bath was increased.

After about forty-five minutes, it was observed that vials 1 and 3 started boiling when the hot mineral oil bath reached about 126° C. It was observed that the zeolite of vials 1, 2, and 4 tended to clump and slide as a large mass with some residual fines while vial 3 had more spalling and larger fines than the other vials. After about three hours, the experiment was paused and the vials were removed from the hot mineral oil bath and allowed to cool. Once cooled, the zeolite from each vial was poured onto a separate watch glass for further observation. It was found that the zeolite from vials 3 and 4 had similar feel regarding ease of separability and residual solvent cohesive properties. Zeolite from vials 1 and 2 were found to have similar ease of separability and were observed to be easier to separate than zeolite from vials 3 and 4.

Each of the four samples of zeolite was allowed to dry for four days on a watch glass. Each of the samples were replaced in their respective vials and placed into a hot mineral oil bath with a set point of 170° C. After about five hours, the samples were placed back onto their respective watch glasses, and it was observed that the cohesion of zeolite from vial 3 was less than the zeolite from vial 2, which was about equal to the cohesion of zeolite from vial 4 and which was less than the cohesion of the zeolite from vial 1.

Example 5

Coated zeolite samples were prepared by allowing zeolite to soak in a container of Australian crude oil for a week at room temperature. The crude oil was drained from the zeolite samples and five vials were prepared according to Table 6.

TABLE 6

| Vial | Coated Zeolite (g) | Benzyl Alcohol (mL) | Dipropylene Glycol (mL) | Ethyl Lactate (mL) | d-Limonene (mL) | Soy Methyl Ester (mL) | Ethoxylated Alcohol (mL) |
|---|---|---|---|---|---|---|---|
| 1 | 2.03 | — | — | — | 10 | — | — |
| 2 | 2.04 | — | 0.4 | — | — | 9.6 | — |
| 3 | 1.98 | 2 | — | — | — | 8 | — |
| 4 | 1.97 | — | — | 2 | — | 8 | — |
| 5 | 1.99 | — | — | — | — | 9.6 | 0.4 |

Each of the five vials was placed in a hot mineral oil bath at 120° C. After about an hour, each vial was removed from the bath and swirled. After about four hours, the vials were removed from the bath and allowed to cool. Each sample was observed for whiteness and by extension, how much oil had been removed from the zeolite. It was observed that the most oil was removed from vial 2 and 4, which were approximately equal. It was further observed that vial 5 performed better than vial 3, which performed better than vial 1.

Example 6

The remaining coated zeolite sample from Example 4 was heated to 163° C. and 28.5 grams of 6×8 mesh clinoptilolite natural zeolite and 8.03 grams of blown asphalt was added. The zeolite was stirred until a uniform coating was observed. Samples were prepared according to Table 7.

TABLE 7

| Vial | Zeolite (g) | Benzyl Alcohol (mL) | Dipropylene Glycol (mL) | Ethyl Lactate (mL) | d-Limonene (mL) | Soy Methyl Ester (mL) | Ethoxylated Alcohol (mL) |
|---|---|---|---|---|---|---|---|
| 1 | 2.01 | — | — | — | 10 | — | — |
| 2 | 2.00 | — | 0.4 | — | — | 9.6 | — |
| 3 | 2.02 | — | — | — | — | 9.6 | 0.4 |
| 4 | 1.99 | 2 | — | — | — | 8 | — |
| 5 | 2.02 | — | — | 2 | — | 8 | — |
| 6 | 2.02 | 1 | — | 1 | — | 8 | — |
| 7 | 2.04 | 0.5 | — | — | — | 9.5 | — |
| 8 | 2.03 | — | — | 0.5 | — | 9.5 | — |

After preparation, each vial was placed in a sonicator for ten minutes. The vials were then placed in an oven at 110° C. The vials were removed from the oven after about forty-five minutes. It was observed that vials 1, 4, 5, and 7 flowed the easiest while vials 2, 3, and 8 flowed slightly less. Only vial 6 was observed to have packed and settled fines at the bottom. The vials were placed back into the oven. After a total of four hours in the oven, the vials were taken out, observed, and allowed to cool overnight. While hot, the vials did not show a perceptible difference. After about fifteen hours, the zeolite from each vial was removed and placed on a paper towel to remove excess solution and thereafter transferred to individual watch glasses. Although difficult to determine for every sample, the overall amount of residue removed was found to be least for vial 4, and second least for vials 1 and 2. Due to the difficulty in determining the remaining vials by visual inspection, two alternate rankings were performed. The first ranked the vial solutions' effectiveness in order based on flow of residue, from most to least flow, and the ranking was as such: vial 4>5>3=7>6>1>2>8. The second ranking examined how the treated catalyst behaved in solution. For this, each sample of zeolite was placed back into the respective vial, and the cold cohesive behaviors were found to be in order of least cohesive to most cohesive to be $4 \leq 1 \leq 2 \leq 5 \approx 6 < 3 \approx 7 < 8$. The vials were allowed to sit undisturbed for approximately 2.5 weeks after which the vials were each carefully tilted to about 75°, and the zeolite behavior was observed. It was found that vials 1, 2, and 3 easily flowed off the vial bottom; vials 4, 6, and 8 had about ⅓ of the zeolite stick to the vial bottom; and vials 5 and 7 had a majority of the zeolite stay on the vial bottom and remain in place.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of equipment decontamination comprising:
    (A) introducing a cleaning stream comprising hydrogen and a solvent composition comprising a hydrocarbon solvent and a cutting fluid into the equipment; and
    (B) introducing a stream comprising nitrogen into the equipment, wherein the equipment comprises deposits.

2. The method of claim 1, further comprising introducing a solvent-free hydrogen stream before step (A), wherein the solvent-free hydrogen stream is at a temperature of about 150° C. to about 300° C.

3. The method of claim 1, wherein step (A) comprises: injecting the solvent composition into a hydrogen stream; vaporizing the solvent composition with the hydrogen stream; and dispersing the solvent composition with the hydrogen stream.

4. The method of claim 1, wherein the hydrocarbon solvent is a bicyclic hydrocarbon compound comprising two fused benzene rings.

5. The method of claim 4, wherein the two fused benzene rings comprise one aromatic ring and on saturated ring.

6. The method of claim 1, wherein the hydrocarbon solvent comprises a Kb value between 120 Kb and 150 Kb.

7. The method of claim 1, wherein the hydrocarbon solvent comprises naphthalene, tetralin, decalin, or any combinations thereof.

8. The method of claim 1, wherein the hydrocarbon solvent is present in an amount ranging between about 60% to about 100% by volume of the solvent composition.

9. The method of claim 1, wherein the cutting fluid is any material capable of being naturally distilled from crude oil.

10. The method of claim 1, wherein the cutting fluid comprises diesel, kerosene, naphtha, or any combinations thereof.

11. The method of claim 1 further comprising:
    absorbing the deposits, disaggregating the deposits, or any combinations thereof;
    and generating a bottoms stream comprising the hydrogen, the solvent composition, and the absorbed and/or disaggregated deposits.

12. The method of claim 11 further comprising removing at least a portion of the solvent composition and the absorbed and/or disaggregated deposits.

13. The method of claim 1, wherein the equipment is a reactor comprising a catalyst and wherein the method further comprises removing at least a portion of the catalyst after step (B).

14. A method comprising:
    (A) introducing a stream comprising hydrogen into a reactor, wherein the reactor comprises a catalyst, deposits on the catalyst, and other contaminants;

(B) introducing into the stream comprising hydrogen a solvent composition stream comprising a hydrocarbon solvent and a cutting fluid;

(C) vaporizing the solvent composition stream into the stream comprising hydrogen to produce a cleaning stream;

(D) contacting the deposits with the cleaning stream and removing at least a portion of the deposits and/or other contaminants with the cleaning stream; and (E) introducing a nitrogen stream into the reactor.

15. The method of claim 14, wherein the hydrogen stream is at a temperature of about 150° C. to about 300° C.

16. The method of claim 14, wherein the deposits comprise at least one of an unsaturated hydrocarbon, an aromatic hydrocarbon, a hydrocarbon based gum, a hydrocarbon based resin, a heavy oil, or oligomers.

17. The method of claim 14, wherein the other contaminants are comprised of, but not limited to, hydrogen sulfide, benzene, dispersed combustible materials, or combinations thereof.

18. The method of claim 14, wherein the hydrocarbon solvent comprises naphthalene, tetralin, decalin, or any combinations thereof.

19. The method of claim 14, wherein the cutting fluid comprises diesel, kerosene, naphtha, or any combinations thereof.

20. The method of claim 11 further comprising:
generating a bottoms stream from the reactor comprising the cleaning stream and the removed portion of the deposits; and
removing the deposits and at least a portion of the solvent from the bottoms stream to produce a hydrogen waste stream.

* * * * *